(12) United States Patent
Wang et al.

(10) Patent No.: US 7,771,875 B2
(45) Date of Patent: Aug. 10, 2010

(54) POSITIVE ELECTRODES FOR RECHARGEABLE BATTERIES

(75) Inventors: Chuanfu Wang, Shenzhen (CN); Zhanfeng Jiang, Shenzhen (CN); Junqing Dong, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 1196 days.

(21) Appl. No.: 10/918,580

(22) Filed: Aug. 13, 2004

(65) Prior Publication Data

US 2005/0037263 A1 Feb. 17, 2005

Related U.S. Application Data

(63) Continuation-in-part of application No. 10/841,760, filed on May 8, 2004, and a continuation-in-part of application No. 10/823,931, filed on Apr. 14, 2004, now abandoned, and a continuation-in-part of application No. 10/733,018, filed on Dec. 10, 2003, now abandoned, and a continuation-in-part of application No. 10/717,236, filed on Nov. 19, 2003, now abandoned.

(30) Foreign Application Priority Data

Aug. 15, 2003 (CN) ............... 03 1 40196
Aug. 15, 2003 (CN) ............... 03 1 40216
Oct. 28, 2003 (CN) ........... 2003 1 0111966

(51) Int. Cl.
*H01M 4/58* (2010.01)
*H01M 4/32* (2006.01)

(52) U.S. Cl. .............. 429/231.1; 429/231.3; 429/231.2; 429/223; 252/182.1

(58) Field of Classification Search .............. 429/231.1, 429/223, 231.3, 231.95, 594.4, 594.6; 252/182.1; 427/126.6
See application file for complete search history.

(56) References Cited

U.S. PATENT DOCUMENTS

| | | | |
|---|---|---|---|
| 2003/0025482 A1* | 2/2003 | Tsukamoto et al. | 320/157 |
| 2003/0138697 A1* | 7/2003 | Leising et al. | 429/231.1 |
| 2004/0076883 A1* | 4/2004 | Aoshima et al. | 429/223 |
| 2005/0118496 A1* | 6/2005 | Chang et al. | 429/231.1 |
| 2005/0130044 A1* | 6/2005 | Aoshima et al. | 429/223 |

FOREIGN PATENT DOCUMENTS

WO  WO 02/84777  * 10/2002

* cited by examiner

*Primary Examiner*—Raymond Alejandro
(74) *Attorney, Agent, or Firm*—Venture Pacific Law, PC

(57) ABSTRACT

Active materials for positive electrodes of rechargeable batteries and the methods of fabrication for the active materials as well as positive electrodes thereof are provided, where the active material comprises of a mixture of two components, A and B. A are compounds of lithium nickel cobalt metal oxide while B are oxides of lithium cobalt. In a preferred embodiment, a formula for the compounds of lithium nickel metal oxide, A, is $Li_aNi_{1-b-c}Co_bM_cO_2$ where $0.97 \leq a \leq 1.05$, $0.01 \leq b \leq 0.30$, $0 \leq c \leq 0.10$, and M is one or more of the following: manganese, aluminum, titanium, chromium, magnesium, calcium, vanadium, iron, and zirconium. The weight ratio of A:B is between 20:80 and 80:20.

2 Claims, No Drawings

POSITIVE ELECTRODES FOR RECHARGEABLE BATTERIES

CROSS REFERENCE

This application claims priority from the following Chinese patent applications:

"Active Materials for the Positive Electrodes of Anhydrous Rechargeable Batteries, Their Methods of Fabrication and Anhydrous Rechargeable Batteries Using said Materials", filed on Aug. 15, 2003, and having a Chinese Patent No. CN1581543; and "A Type of Lithium Ion Rechargeable Battery and Methods of Fabrication for Its Positive Electrodes", filed on Aug. 15, 2003 and having a Chinese Patent No. CN1581561; and "Lithium Ion Rechargeable Battery", filed on Oct. 28, 2003 and having a Chinese Patent No. CN1612401.

All of the above applications are incorporated herein by reference.

This application is a continuation-in-part of the following U.S. patent applications:

"Methods for Preparation from Carbonate Precursors the Compounds of Lithium Transition Metal Oxide", filed on Nov. 19, 2003 now abandoned having a U.S. patent application No. 10/717,236;

"Lithium Ion Secondary Batteries", filed on Dec. 10, 2003 now abandoned and having a U.S. patent application Ser. No. 10/733,018;

"Compounds of Lithium Nickel Cobalt Metal Oxide and the Methods of Their Fabrication", filed on Apr. 14, 2004 now abandoned and having a U.S. patent application Ser. No. 10/823,931; and "Improved Lithium Nickel Cobalt Oxides and Their Methods of Fabrication" filed on May 8, 2004, and having a U.S. patent application Ser. No. 10/841,760.

FIELD OF INVENTION

This invention relates to positive electrodes and the active materials for positive electrodes of rechargeable batteries and their methods of fabrication.

BACKGROUND

In recent years, with the rapid development of the electronic and information technology industries, demands on the power sources for electronic products have increased. With the widespread use of lithium ion rechargeable batteries with their excellent properties, demands on better performance for these batteries have also increased. Lithium ion rechargeable batteries are asked to possess excellent overall properties; to simultaneously have high discharge capacity, high discharge energy, long cycle life and excellent large current discharge characteristics.

The material for the positive electrodes is one of the key elements for determining the performance of rechargeable batteries and the electrical chemical characteristics.

At present, the active materials for positive electrodes of lithium ion rechargeable batteries are mainly embedded type compounds. The more widely used ones are lithium cobalt salts such as, $LiCoO_2$. However, $LiCoO_2$ type materials are expensive and their sources are scarce. Therefore, compounds of lithium manganese oxides and compounds of lithium nickel oxides have been suggested as substitutes. Compounds of lithium manganese oxides have the disadvantages that batteries fabricated with these compounds as positive electrodes have lower theoretical capacities and larger ranges of decreases in their capacities during repeated charging and discharging cycles and under higher temperatures.

Although the compounds of lithium nickel oxides do not possess the weaknesses of the compounds of lithium manganese oxides, $LiNiO_2$ possesses the same crystal structure as $LiCoO_2$ and its properties are inferior to those of $LiCoO_2$. $Ni^{3+}$ ion, when compared with the $Co^{3+}$ ion, more easily reverts back to the $Ni^{2+}$ ion. Since the size of $Ni^{2+}$ and the $Li^+$ ion are similar, ($rNi^{2+}$=8.7 nm, $rLi^+$=9.0 nm), the $Ni^{2+}$ ion and the $Li^+$ ion can easily replace each other. This results in the formation of halite magnetic domains with inactive electrochemical properties that cause the lowering of the capacities of batteries when these compounds are used as active materials for positive electrodes.

In order to compensate for their weaknesses, these compounds of lithium nickel oxide are often treated by coating and/or doping with metal oxides. Among these, compounds of lithium nickel cobalt oxides doped with cobalt exhibit the best properties. Further doping of these compounds of lithium nickel cobalt oxides with metal can enhance their properties more. The specific discharge capacity of the compounds of lithium nickel cobalt oxide is generally 180 mAh/g, higher than the 140 mAh/g of the oxides of lithium cobalt. However, due to the effect of the self oxidation potential of the material, the mean voltage of the compounds of lithium nickel cobalt oxide during the discharge process is approximately 3.6V, lower than the 3.8V of the oxides of lithium cobalt. As a result, its specific energy is merely 600 mWh/g. This increase in range is limited when compared with the specific energy of the oxides of lithium cobalt (550 mWh/g). Therefore, the improvement of the overall properties of the batteries is also limited.

Due to the limitations of the prior art, it is therefore desirable to have novel fabrication methods in combination with novel materials that have good electrochemical properties such that when these novel materials are used as materials for positive electrodes of batteries, the batteries have high discharge capacities, high discharge capacity, long cycle life, and excellent large discharge current characteristics.

SUMMARY OF INVENTION

An object of this invention is to provide positive electrodes for rechargeable batteries and their active materials, in order to provide for batteries having high discharge capacity, high discharge energy capacity, long cycle life, and excellent large discharge current characteristics.

Another object of this invention is to provide fabrication methods for positive electrode having good electrochemical properties in order to provide for batteries having high discharge capacity, high discharge energy capacity, long cycle life, and excellent large discharge current characteristics.

The present invention discloses active materials for the positive electrodes for rechargeable batteries and the methods of fabrication for the active materials and the positive electrodes. Said active material comprises of a mixture of two components, A and B. A are compounds of lithium nickel cobalt metal oxide while B are oxides of lithium cobalt. In a preferred embodiment, a formula for said compounds of lithium nickel metal oxide, A, is $Li_aNi_{1-b-c}Co_bM_cO_2$ where $0.97 \leq a \leq 1.05$, $0.01 \leq b \leq 0.30$, $0 \leq c \leq 0.10$, and M is one or more of the following: manganese, aluminum, titanium, chromium, magnesium, calcium, vanadium, iron, and zirconium and the weight ratio of A:B is between 20:80 and 80:20.

The method for the fabrication of said component A, compounds of lithium nickel cobalt metal oxide includes: (a) fabricating a cobalt nickel hydroxy compound; (b) ballgrinding to evenly mix said cobalt nickel hydroxy compound; a lithium compound, and compound of said metal M; (c) calcining said mixture in oxygen at between 600° C. and 720° C. for 1 hour to 10 hours; (d) calcining a second time in oxygen at between 750° C. and 900° C. for 8 hours to 10 hours; (e) cooling the twice calcined compound rapidly; and (f) ballgrinding and then sifting the cooled compound to obtain said compound of lithium nickel cobalt metal oxide.

To fabricate said positive electrode from components A and B, combine A and B in the weight ratio of between 20:80 and 80:20; add binder, conducting agent, and solvent; stir to mix; coat by smearing; dry with heat; and press into a slice.

An advantage of this invention is that the positive electrodes of this invention, the positive electrodes fabricated with the fabrication methods of this invention or with the materials disclosed in this invention, exhibit excellent overall and electrochemical properties with no formation of halite magnetic domains. These positive electrodes, when used in rechargeable batteries produce batteries with high discharge capacity, high discharge energy, long cycle life, and excellent large discharge current characteristics.

Another advantage of this invention is that the fabrication technology is simple, the production cost is low, and the fabrication methods are easy to implement for industrial production.

DETAILED DESCRIPTION OF THE PREFERRED EMBODIMENTS

The present invention discloses active materials for the positive electrodes of rechargeable batteries and the methods of fabrication for the active materials of the positive electrodes and the positive electrodes. Batteries made with the embodiments include a positive electrode whose active material is made by or with embodiments of this invention, a negative electrode, electrolyte and separator. Said embodiments of the active materials are made from a mixture of the compounds of lithium nickel cobalt metal oxide, A, and the oxide of lithium cobalt, B. In the preferred embodiments, the weight ratio of A and B is between 20:80 and 80:20; the chemical formula for the compounds of lithium nickel cobalt metal oxide, A, is $Li_aNi_{1-b-c}Co_bM_cO_2$ ($0.97 \leq a \leq 1.05$, $0.01 \leq b \leq 0.30$, $0 \leq c \leq 0.10$), where M is one or more of the following: Mn, Al, Ti, Cr, Mg, Ca, V, Fe and Zr; the average granule diameter ($D_{50}$) of A is between 5 and 40 μm; and its $I_{003}/I_{104}$ is greater than 1.20. In the embodiments, the average granule diameters, $D_{50}$, are measured using a laser scattering particle analyzer.

The average granule diameter, $D_{50}$, of the granules of compound of lithium nickel cobalt metal oxide, A, should be between 5 and 40 μm in order for the material to be adequately electrochemically active. The preferred range is between 5 and 20 μm. If the average granule diameter, $D_{50}$, of A is reduced to less than 5 μm, a part of the granules of the compound cannot be in contact with the conducting agent. On the other hand, when the average granule diameter, $D_{50}$, is greater than 40 μm, the electrolyte cannot penetrate inside the granules and part of the material cannot be utilized fully during the charging and discharging process of the battery.

One of the characteristics of embodiments of this invention is that, in the X-ray diffraction picture (CuKα) of A, the compounds of lithium nickel cobalt metal oxide of these embodiments, $I_{003}/I_{104}$ is larger than 1.20 where, $I_{003}/I_{104}$ is the ratio of the intensity of the diffraction peak on the said A's (003) crystalline surface, $I_{003}$, and the intensity of the diffraction peak of said A's (104) crystalline surface, $I_{104}$. When the ratio of $I_{103}/I_{104}$ is greater than 1.20, said compound A does not have any halite magnetic domain formations without active electrochemical properties.

The oxides of lithium cobalt, B, have been used as the active material for positive electrodes of lithium ion rechargeable battery. The preferred embodiments use oxides of lithium cobalt with average granule diameters, $D_{50}$, between 5 and 40 μm.

A preferred selection for the average granule diameter, $D_{50}$, of A, the compounds of lithium nickel cobalt metal oxide is between 5 and 20 μm.

Compounds of lithium nickel cobalt metal oxide, A, have a higher discharge specific capacity (180 mAh/g) while oxides of lithium cobalt, B, have a higher mean discharge voltage (3.8V). A mixture of the two takes advantage of the synergistic effect between the similar structures of the materials. Their strengths are utilized while their weaknesses suppressed such that the reversible capacity of batteries whose positive electrodes are made from said mixture is effectively increased. Best results in battery performance are obtained when the weight ratio of the compound of lithium nickel cobalt metal oxide, A, and the oxide of lithium cobalt, B, in the mixture is between 20:80 and 80:20.

An embodiment of the method of fabrication for the positive electrodes include (i) the fabrication of a cobalt nickel hydroxy compound; (ii) using said cobalt hydroxy compound to fabricate the compounds of lithium nickel cobalt metal oxide, A; (iii) mixing said compound of lithium nickel cobalt metal oxide with said oxide of lithium cobalt to form the active material of positive electrodes of rechargeable batteries; and (iv) fabricating said active material to form said positive electrodes.

Said cobalt nickel hydroxy compound is fabricated by adding aqueous ammonia to a uniformly mixed solution of cobalt sulfate and nickel sulfate to form the cobalt nickel hydroxy compound whose formula is $Ni_{1-b}Co_b(OH)_2$.

The fabrication of the compound of lithium nickel cobalt metal oxide from the cobalt nickel hydroxy compound includes the following steps:

(a) Ballgrinding to mix evenly mix predetermined quantities of lithium compound, said $Ni_{1-y}Co_y(OH)_2$, and an M compound containing a metal M in a stochiometric basis; in this step, the ratio of Li/(Ni+Co+M) is between 1.01 and 1.10;

(b) Calcining in a first calcination said mixture in oxygen atmosphere at between 600° C. and 720° C. for 1 hour to 10 hours;

(c) Calcining in a second calcination in oxygen atmosphere at 750° C. to 900° C. for 8 hours to 20 hours;

(d) Cooling rapidly the twice calcined product from step such that the high temperature phase of the twice calcined product is retained;

(e) Processing said cooled mixture to obtain said A, the compound of lithium nickel cobalt metal oxide compound. The processing step can include ballgrinding the cooled mixture; and then sifting the ballgrinded mixture.

To fabricate the active material for the positive electrode, said A, the compound of lithium nickel cobalt metal oxide that can be fabricated by above the method stated in above described embodiments is mixed with the oxide of lithium cobalt in the weight ratio of between 20:80 and 80:20.

The average granule diameter, $D_{50}$, of the compound of lithium nickel cobalt metal oxide, A, should be between 5 and 40 μm in order for the material to be adequately electrochemically active. The preferred range is between 5 and 20 μm.

Embodiments of said compound A, the compound of lithium nickel cobalt metal oxide, has the chemical formula $Li_aNi_{1-b-c}Co_bM_cO_2$, This compound has different structures at high and low temperatures. Moreover, only the hexagonal layered halite structure of said compound at high temperature has good electrochemical properties. Therefore, rapid cooling such as cooling the heated calcined product at room temperature in a dry atmosphere can be used to retain the high temperature phase structure of the compound of lithium nickel cobalt metal oxide.

To fabricate the positive electrode of rechargeable batteries, binder, conducting agent, and solvent is added to the active material of positive electrodes fabricated as described above. The ingredients in this mixture is stirred to mix at 300 rpm to 6000 rpm for 0.2 to 10 hours, dried with heat, and then pressed into a slice to form the positive electrode.

When formulating the reaction mixture to form said compound of lithium nickel cobalt metal oxide from said cobalt nickel hydroxy compound, the amount of lithium compound must be adequately increased to compensate for the loss of lithium from volatilization during the calcinations at high temperature. However, too much lithium will cause contamination of the final product since the substance cannot be calcined at too high a temperature or for too long. Therefore, in formulating the reactants, Li/(Ni+Co+M) should be between 1.01 and 1.10.

Said binders can be fluoropolymers such as polytetrafluoroethylene and polyvinylidene fluoride, and olefin polymers such as polyethylene and polyvinyl alcohol. Conducting agents can be carbon materials such as carbon black and graphite. Solvents can be N-methyl-pyrrolidone, dimethylamide, anhydrous ethanol etc. The current collectors for the negative electrode can be copper foil, stainless steel foil and nickel foil, with or without pores.

To fabricate the negative electrode of the lithium ion rechargeable battery, the active material for the negative electrode, its corresponding binder, dispersant and solvent are smeared on the collector of the negative electrode. Then, it is heated to dry and pressed to form a slice. Said active material for the negative electrode can be lithium metal, lithium alloy, or materials that lithium ions can intercalate and deintercalate. Examples of materials that lithium ions can intercalate and deintercalate include carbon containing material such as natural graphite, artificial graphite, coke, carbon black, pyrolyzed carbon, carbon fiber, the calcined products of organic and chalcogenides such as oxides and sulfides that lithium ions can intercalate and deintercalate at potentials lower than that of the positive electrode. Graphite (natural and artificial graphite) is the most suitable carbon containing material. Binders that can be used include fluorinated resins such as polytetrafluoroethylene and polyvinylidene fluoride and polyethylene and polyvinyl alcohol. Dispersants can be fibrin. Solvents can be N-methyl-pyrrolidone, dimethylamide, anhydrous ethanol and de-ionized water. Copper foil, stainless steel foil or nickel foil with or without pores may be used as the collector of negative electrode.

The electrolyte for the lithium ion rechargeable battery is an anhydrous electrolyte. Anhydrous electrolyte that are customarily used are electrolyte salts such as as $LiPF_6$, $LiBF_4$, $LiAsF_6$, $LiClO_4$, $LiSbF_6$, LiCl, LiBr and $LiCF_2SO_3$ and other lithium salts. From the standpoint of oxidization stability, $LiClO_4$, $LiPF_6$, $LiBF_4$ and $LiAsF_6$ are preferred. Organic solvents are used and can be one or more of the following: ethylene carbonate, propylene carbonate, sub-ethyl carbonate, sub-propyl carbonate, dimethyl carbonate, diethyl carbonate, 1,1-dimethoxyethane or 1,2-dimethoxyethane, 1,2-diethoxyethane, tetrahydrofuran, 2-methyltetrahydrofuran, anisole, ether, N-methyl-pyrrolidone, dimethyl-amide, acetonitrile, butanitrile, chloronitrile, and ethyl acetate.

The separator for the lithium ion rechargeable battery can be nonwoven fabric or microporous fabric. Specific examples of microporous fabric are polyethylene, polypropylene and polyethylpropylene. It is preferable to use microoporous fabric of polyalkene.

To fabricate a battery for said embodiments, assemble said positive electrode made with or from said embodiments, negative electrode, separator and battery shell to form a lithium ion rechargeable battery. This battery has high discharge capacity, high discharge energy, long cycle life and excellent large current discharge characteristics. Also, the production cost for this battery is low, the fabrication technology is simple, and it is easy to implement for industrial production.

The following embodiments further describe the details of this invention.

Part 1 Embodiments Relating to the Mixture Ratio of the Compound of Lithium Nickel Cobalt Metal Oxide, A, and the Oxide of Lithium Cobalt, B Embodiment 1

Ballgrind to mix cobalt nickel hydroxy compound $Ni_{0.81}Co_{0.19}(OH)_2$ with granule diameter between 8 μm and 10 μm with 0.52 times molar equivalent of lithium carbonate. Calcine the mixture in oxygen atmosphere at 650° C. for 6 hours. Then calcine at 800° C. for 16 hours to form the compound of lithium nickel cobalt metal oxide, A, with a structure of $Ni_{0.81}Co_{0.19}(OH)_2$. Its average granule diameter, $D_{50}$, is controlled to be between 10 μm and 12 μm. The value of the ratio $I_{003}/I_{104}$ is 1.37.

Mix said A with the oxide of lithium cobalt, B with average granule diameter, $D_{50}$, between 6 μm and 8 μm in the weight ratio of 80:20 to form the active material for the positive electrode. Use 2% PVDF as binder, 3% acetylene black as the conducting agent, and NMP as the solvent. In vacuum, stir at 300 rpm to 6000 μm for 0.2 hours to 10 hours to evenly mix; coat by smearing, and dry with heat. Then press the dried mixture into a slice and the positive electrode of the battery is then formed on the aluminum foil.

To fabricate the lithium ion rechargeable battery, assemble said positive electrode, a negative electrode whose active material is artificial graphite, $LiPF_6$ as the electrolyte salt, an organic solvent with a concentration of 1 mol/l of a mixture of ethylene carbonate, sub-ethyl carbonate and diethyl carbonate, a separator of polyethylene or polypropylene compound, and a battery shell to form lithium ion rechargeable battery.

Embodiment 2

In this embodiment, the ratio of compound of lithium nickel cobalt metal oxide, A, to the oxide of lithium cobalt, B, in the mixture is 75:25. All other fabrication methods, conditions, and processes remain the same as Embodiment 1.

Embodiment 3

In this embodiment, the ratio of compound of lithium nickel cobalt metal oxide, A, to the oxide of lithium cobalt, B, in the mixture is 67:33. All other fabrication methods, conditions, and processes remain the same as Embodiment 1.

Embodiment 4

In this embodiment, the ratio of compound of lithium nickel cobalt metal oxide, A, to the oxide of lithium cobalt, B, in the mixture is 50:50. All other fabrication methods, conditions, and processes remain the same as Embodiment 1.

Embodiment 5

In this embodiment, the ratio of compound of lithium nickel cobalt metal oxide, A, to the oxide of lithium cobalt, B, in the mixture is 33:67. All other fabrication methods, conditions, and processes remain the same as Embodiment 1.

Embodiment 6

In this embodiment, the ratio of compound of lithium nickel cobalt metal oxide, A, to the oxide of lithium cobalt, B, in the mixture is 25:75. All other fabrication methods, conditions, and processes remain the same as Embodiment 1.

Embodiment 7

In this embodiment, the ratio of compound of lithium nickel cobalt metal oxide, A, to the oxide of lithium cobalt, B, in the mixture is 20:80. All other fabrication methods, conditions, and processes remain the same as Embodiment 1.

Comparison Example 1

In this comparison example, only the compound of lithium nickel cobalt metal oxide, A, is used as the active material for the positive electrode. All other fabrication methods, conditions, and processes remain the same as Embodiment 1.

Comparison Example 2

In this comparison example, only the oxide of lithium cobalt, B, is used as the active material for the positive electrode. All other fabrication methods, conditions, and processes remain the same as Embodiment 1.

Test of the Battery Performance Using the Above Described Embodiments and Comparison Examples.

The following battery characteristics are tested on batteries made by positive electrodes fabricated using above described embodiments and comparison examples:

Specific discharge capacity: the discharge capacity using 0.5 C of current to initially discharge from 4.2V to 3.0V after the battery has been initially charged/(the weight of the active material for the positive electrode). The unit of this characteristic is mAh/g.

Specific discharge energy: the discharge energy using 0.5 C of current to initially discharge from 4.2V to the 3.0V after the battery has been initially charged/(the weight of the active material for the positive electrode). The unit of this characteristic is mWh/g.

Cycle: a cycle is the process of using 1 C of electricity to charge to 4.2V and then to discharge the electricity to 3.0V. For each cycle, the discharge capacity is the capacity of that cycle.

Mean discharge voltage: the mean voltage using 0.5 C of current to initially discharge 4.2V to 3.0V after battery has been initially charged. The unit of this characteristic is V.

100 Cycle Capacity Retention Rate=(Discharge capacity at the $100^{th}$ cycle)/(initial discharge capacity)*100%. The unit of this characteristic is %.

Large current discharge characteristics: These characteristics are represented by the ratios 1 C/0.5 C, 2 C/0.5 C and 3 C/0.5 C where 1 C/0.5 C is the ratio of the discharge capacity when the battery is discharged with 1 C of current and the discharge capacity when the battery is discharged with 0.5 C of current; 2 C/0.5 C is the ratio of the discharge capacity when the battery is discharged with 2 C of current and the discharge capacity when the battery is discharged with 0.5 C of current; and, 3 C/0.5 C is the ratio of the discharge capacity when the battery is discharged with 3 C of current and the discharge capacity when the battery is discharged with 0.5 C of current. The unit for these characteristics is %.

Table 1 shows the test results of the batteries using above described embodiments and comparison examples as active material for the positive electrodes.

TABLE 1

| Serial No. | A:B | Specific Discharge Capacity/ mAh/g | Specific Discharge Energy/ mWh/g | Mean Discharge Voltage/V | 100 Cycle Capacity Retention Rate/% | Large Current Discharge characteristics | | |
|---|---|---|---|---|---|---|---|---|
| | | | | | | 1 C/0.5 C/% | 2 C/0.5 C/% | 3 C/0.5 C/% |
| Embodiment 1 | 80:20 | 181 | 685 | 3.78 | 94.5 | 98.1 | 87.5 | 74.3 |
| Embodiment 2 | 75:25 | 180 | 684 | 3.80 | 94.6 | 98.2 | 87.7 | 74.7 |
| Embodiment 3 | 67:33 | 178 | 678 | 3.81 | 94.8 | 98.1 | 87.3 | 75.4 |
| Embodiment 4 | 50:50 | 176 | 665 | 3.81 | 95.0 | 98.4 | 88.5 | 76.7 |
| Embodiment 5 | 33:67 | 175 | 672 | 3.82 | 95.0 | 98.6 | 89.0 | 77.1 |
| Embodiment case 6 | 25:75 | 175 | 668 | 3.82 | 95.4 | 98.7 | 89.6 | 77.8 |
| Embodiment 7 | 20:80 | 174 | 660 | 3.82 | 95.4 | 99.0 | 89.9 | 77.9 |
| Comparison Example 1 | 100:0 | 182 | 610 | 3.58 | 92.8 | 97.0 | 86.6 | 65.2 |
| Comparison Example 2 | 0:100 | 141 | 550 | 3.85 | 95.6 | 98.8 | 90.2 | 78.4 |

Table 1 shows that lithium ion rechargeable batteries with the active materials for the positive electrode comprising of a mixture of the compound of lithium nickel cobalt metal oxide, A, and an oxide of lithium cobalt, B have excellent overall electrical properties when the weight ratio of A:B is between 80:20 and 20:80. The specific discharge energies of these batteries are greatly increased over those of batteries where the active material for the positive electrode only has one of the two components. These batteries have longer cycle lives. Their 100 cycle capacity retention rate is approximately 95% on the average. They also have excellent large current discharge characteristics.

Part 2 Embodiments Relating to Different Average Granule Diameters, $D_5$ of The Compound of Lithium Nickel Cobalt Metal Oxide, A Embodiment 8

In this embodiment, the average granule diameter, $D_{50}$, of the cobalt nickel hydroxy compound, $Ni_{0.81}Co_{0.19}(OH)_2$, used for fabricating the compound of lithium nickel cobalt metal oxide, A, is 3 μm and the average granule diameter, $D_{50}$, of the resultant compound of lithium nickel cobalt metal oxide, A, is 5 μm. All other fabrication methods, conditions, and processes remain the same as Embodiment 1.

Embodiment 9

In this embodiment, the average granule diameter, $D_{50}$, of the cobalt nickel hydroxy compound, $Ni_{0.81}Co_{0.19}(OH)_2$, used for fabricating the compound of lithium nickel cobalt metal oxide, A, is 8 μm and the average granule diameter, $D_{50}$, of the resultant compound of lithium nickel cobalt metal oxide, A, is 10 μm. All other fabrication methods, conditions, and processes remain the same as Embodiment 1.

Embodiment 10

In this embodiment, the average granule diameter, $D_{50}$, of the cobalt nickel hydroxy compound, $Ni_{0.81}Co_{0.19}(OH)_2$, used for fabricating the compound of lithium nickel cobalt metal oxide, A, is 18 μm and the average granule diameter, $D_{50}$, of the resultant compound of lithium nickel cobalt metal oxide, A, is 20 μm. All other fabrication methods, conditions, and processes remain the same as Embodiment 1.

Embodiment 11

In this embodiment, the average granule diameter, $D_{50}$, of the cobalt nickel hydroxy compound, $Ni_{0.81}Co_{0.19}(OH)_2$, used for fabricating the compound of lithium nickel cobalt metal oxide, A, is 28 μm and the average granule diameter, $D_{50}$, of the resultant compound of lithium nickel cobalt metal oxide, A, is 30 μm. All other fabrication methods, conditions, and processes remain the same as Embodiment 1.

Embodiment 12

In this embodiment, the average granule diameter, $D_{50}$, of the cobalt nickel hydroxy compound, $Ni_{0.81}Co_{0.19}(OH)_2$, used for fabricating the compound of lithium nickel cobalt metal oxide, A, is 37 μm and the average granule diameter, $D_{50}$, of the resultant compound of lithium nickel cobalt metal oxide, A, is 40 μm. All other fabrication methods, conditions, and processes remain the same as Embodiment 1.

Comparison Example 3

In this embodiment, the average granule diameter, $D_{50}$, of the cobalt nickel hydroxy compound, $Ni_{0.81}Co_{0.19}(OH)_2$, used for fabricating the compound of lithium nickel cobalt metal oxide, A, is 1 μm and the average granule diameter, $D_{50}$, of the resultant compound of lithium nickel cobalt metal oxide, A, is 3 μm. All other fabrication methods, conditions, and processes remain the same as Embodiment 1.

Comparison Example 4

In this embodiment, the average granule diameter, $D_{50}$, of the cobalt nickel hydroxy compound, $Ni_{0.81}Co_{0.19}(OH)_2$, used for fabricating the compound of lithium nickel cobalt metal oxide, A, is 40 μm and the average granule diameter, $D_{50}$, of the resultant compound of lithium nickel cobalt metal oxide, A, is 42 μm. All other fabrication methods, conditions, and processes remain the same as Embodiment 1.

Test of the Battery Performance Using the Above Described Embodiments and Comparison Examples.

The battery characteristics described in Part 1 are tested on batteries made by positive electrodes fabricated using above described embodiments and comparison examples in Part 2.

TABLE 2

| No. | Average Granule Diameter, $D_{50}$, of A/μm | Specific Discharge Capacity/ mAh/g | Specific Discharge Energy/ mWh/g | Mean Discharge Voltage/V | 100 Cycle Capacity retention rate/% | Large Current Discharge Characteristics | | |
|---|---|---|---|---|---|---|---|---|
| | | | | | | 1 C/0.5 C/% | 2 C/0.5 C/% | 3 C/0.5 C/% |
| Embodiment 8 | 5 | 178 | 675 | 3.78 | 94.6 | 98.0 | 87.2 | 74.0 |
| Embodiment 9 | 10 | 181 | 685 | 3.78 | 94.5 | 98.1 | 87.5 | 74.3 |
| Embodiment 10 | 20 | 180 | 680 | 3.78 | 95.1 | 98.1 | 87.3 | 74.5 |
| Embodiment 11 | 30 | 174 | 655 | 3.78 | 94.2 | 98.2 | 85.9 | 73.9 |
| Embodiment 12 | 40 | 170 | 645 | 3.78 | 94.0 | 97.8 | 84.2 | 70.2 |
| Comparison Example 3 | 3 | 164 | 620 | 3.78 | 88.8 | 97.0 | 79.3 | 61.7 |
| Comparison Example 4 | 42 | 159 | 600 | 3.78 | 90.3 | 97.3 | 80.8 | 64.6 |

The results in Table 2 show that the average granule diameter, $D_{50}$, of the compound of lithium nickel cobalt metal oxide, A, should be between 5 μm and 40 μm in order for batteries with positive electrodes made from the above described active materials to show excellent overall electrical characteristics. The preferred range for the average granule diameter, $D_{50}$, is 5 μm and 20 μm.

Part 3 Embodiments Relating to the Value of $I_{003}/I_{104}$ of the Compound of Lithium Nickel Cobalt Metal Oxide A Embodiment 13

This embodiment is the same as Embodiment 1.

Embodiment 14

In this embodiment, ballgrind to mix cobalt nickel hydroxy compound $Ni_{0.81}Co_{0.19}(OH)_2$ with granule diameter of between 8 μm and 10 μm with 0.52 times the molar equivalent of lithium carbonate. Calcine the mixture in oxygen atmosphere at 650° C. for 6 hours. Then calcine at 800° C. for 8 hours to form the active material for the positive electrode, A. The chemical structure for A is $Ni_{0.81}Co_{0.19}(OH)_2$. Its average granule diameter, $D_{50}$, is between 9 μm and 12 μm. Its $I_{003}/I_{104}$ value is 1.20. All other fabrication methods, conditions, and processes remain the same as Embodiment 1.

Comparison Example 5

In this comparison example, when fabricating the compound of lithium nickel cobalt metal oxide, A, ballgrind to mix the cobalt nickel hydroxy compound, $Ni_{0.81}Co_{0.19}(OH)_2$, with granule diameter between 8 μm and 10 μm with 0.52 times the molar equivalent of lithium carbonate. Calcine the mixture in air at 650° C. for 6 hours. Then calcine it at 800° C. for 16 hours to obtain the compound of lithium nickel cobalt metal oxide, A. The chemical structure for A is $LiNi_{0.81}Co_{0.19}O_2$. Its average granule diameter, $D_{50}$, is between 10 μm and 12 μm. The value of its ratio $I_{003}/I_{104}$ value is 1.11. All other fabrication methods, conditions, and processes remain the same as Embodiment 1.

Comparison Example 6

In this comparison example, when fabricating the compound of lithium nickel cobalt metal oxide, A, after grinding to mix the nickel hydroxide, cobaltosic oxide and lithium carbonate in the molar ratio of 0.81:0.06:0.52. Calcine in oxygen atmosphere at 650° C. for 6 hours. Then calcine at 800° C. for 16 hours to obtain the compound of lithium nickel cobalt metal oxide, A, whose chemical structure is $LiNi_{0.81}Co_{0.19}O_2$. Its average granule diameter, $D_{50}$, is 10 μm and 12 μm. The value of the ratio $I_{003}/I_{104}$ value is 1.15. All other fabrication methods, conditions, and processes remain the same as Embodiment 1.

Test of The Battery Performance Using The Above Described Embodiments and Comparison Examples.

The battery characteristics described in Part 1 are tested on batteries made by positive electrodes fabricated using above described embodiments and comparison examples in Part 3.

TABLE 3

| Serial No. | A:B | $I_{003}/I_{104}$ | Specific Discharge Capacity/ mAh/g | Specific Discharge Energy/ mWh/g | Mean Discharge Voltage/V | 100 Cycle Capacity Retention Rate/% | Large Current Discharge Characteristics | | |
|---|---|---|---|---|---|---|---|---|---|
| | | | | | | | 1 C/0.5 C/% | 2 C/0.5 C/% | 3 C/0.5 C/% |
| Embodiment 13 | 80:20 | 1.37 | 181 | 685 | 3.78 | 94.5 | 98.1 | 87.5 | 74.3 |
| Embodiment 14 | 80:20 | 1.20 | 179 | 680 | 3.78 | 94.3 | 98.4 | 87.3 | 73.6 |
| Comparison Example 5 | 80:20 | 1.11 | 170 | 640 | 3.75 | 76.5 | 95.2 | 78.5 | 54.0 |
| Comparison Example 6 | 80:20 | 1.15 | 172 | 645 | 3.76 | 82.9 | 95.6 | 77.3 | 60.1 |

Table 3 shows that the electrochemical properties of the active material for the positive electrode is better when the ratio of the intensity of its diffraction peak on the 003 crystalline surface, $I_{003}$, to that on the 104 crystalline surface, $I_{104}$, that is, $I_{003}/I_{104}$, is greater than 1.20 and no halite magnetic domain exists.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but all those other and further alterations and modifications as would be apparent to those of ordinary skilled in the art.

We claim:

1. A positive electrode for a battery, comprising:
   a compound of lithium nickel cobalt metal oxide, A, wherein a metal in said compound A is at least one metal selected from the group consisting of: titanium, chromium, calcium, vanadium, and iron, wherein said compound A having a formula, $Li_aLNi_{1-b-c}Co_bM_cO_2$, wherein M is the metal in compound A, and wherein $0.97 \leq a \leq 1.05$, $0.01 \leq b \leq 0.30$, and $0 \leq c \leq 0.10$; and
   an oxide of lithium cobalt, B;
   wherein said compound A having a first (003) crystalline surface having a X-ray diffraction peak with an intensity of $I_{003}$; wherein said compound A having a second (104) crystalline surface having an X-Ray diffraction peak with an intensity of $I_{104}$; and wherein the ratio of said $I_{003}/I_{104}$ is greater than 1.20 wherein said compound A has granule diameters between 5 μm and 20 μm.

2. The positive electrode of claim 1 wherein the weight ratio of said compound A and said oxide B is in the range of 20:80 and 80:20.

* * * * *